F. STREICH.
DOUGH MOLDING MACHINE.
APPLICATION FILED JUNE 21, 1909.
957,390.
Patented May 10, 1910.
4 SHEETS—SHEET 1.
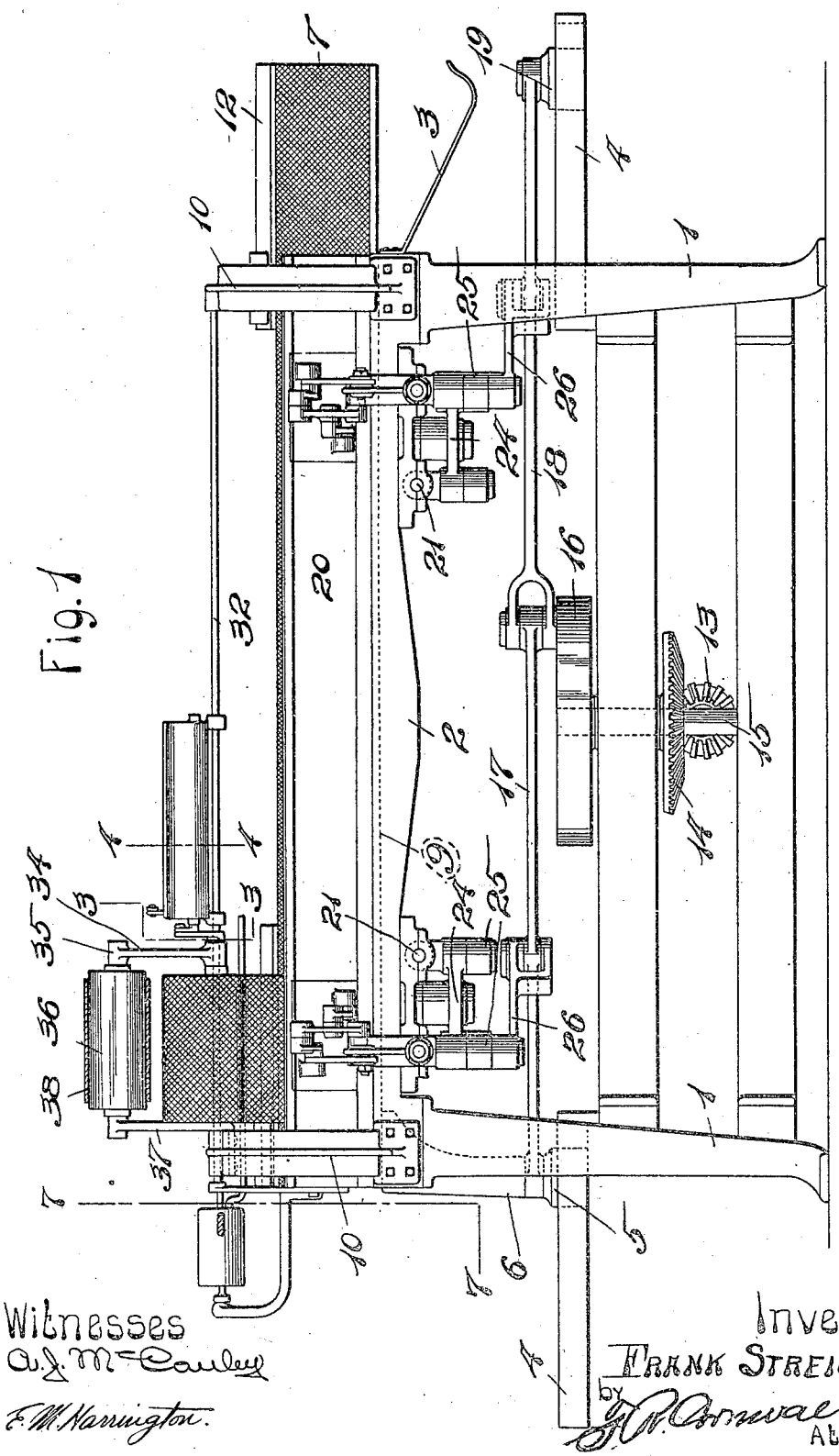
Witnesses
A. J. McCauley
E. M. Harrington.
Inventor:
Frank Streich.
by
J. R. Cornwall
Att'y

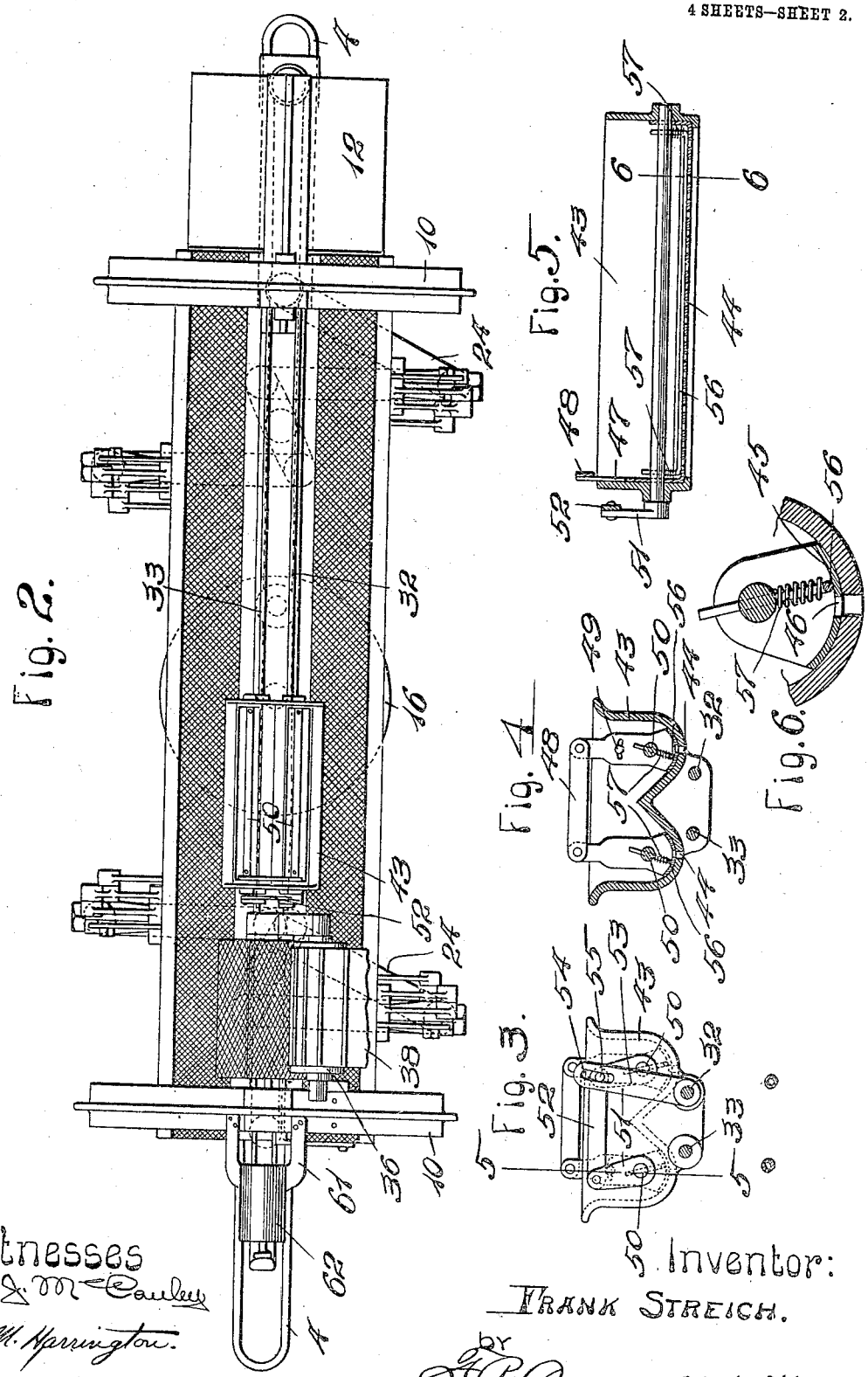

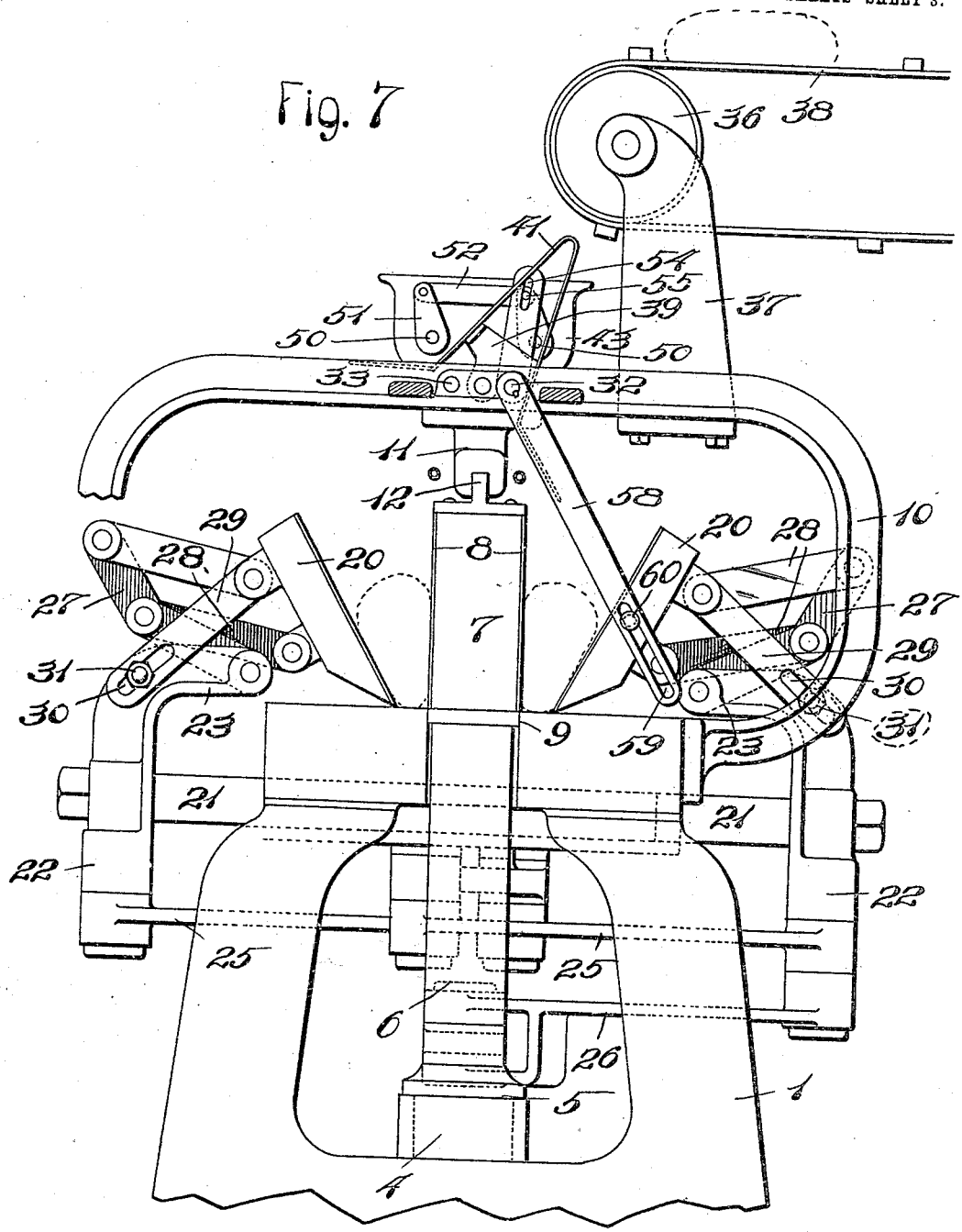

F. STREICH.
DOUGH MOLDING MACHINE.
APPLICATION FILED JUNE 21, 1909.
957,390.
Patented May 10, 1910.
4 SHEETS—SHEET 4.
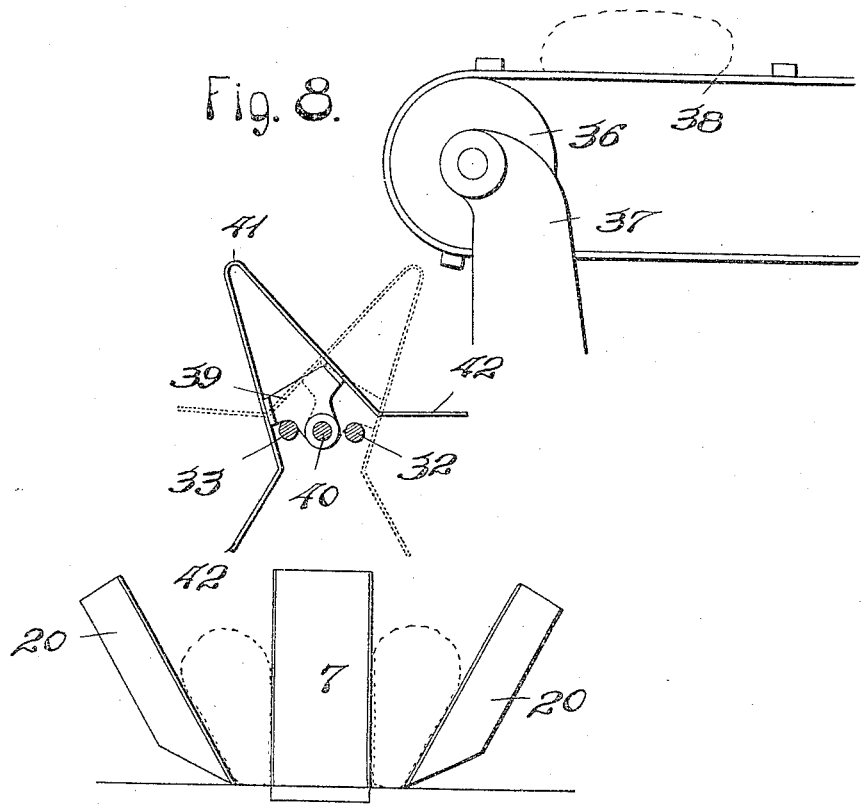
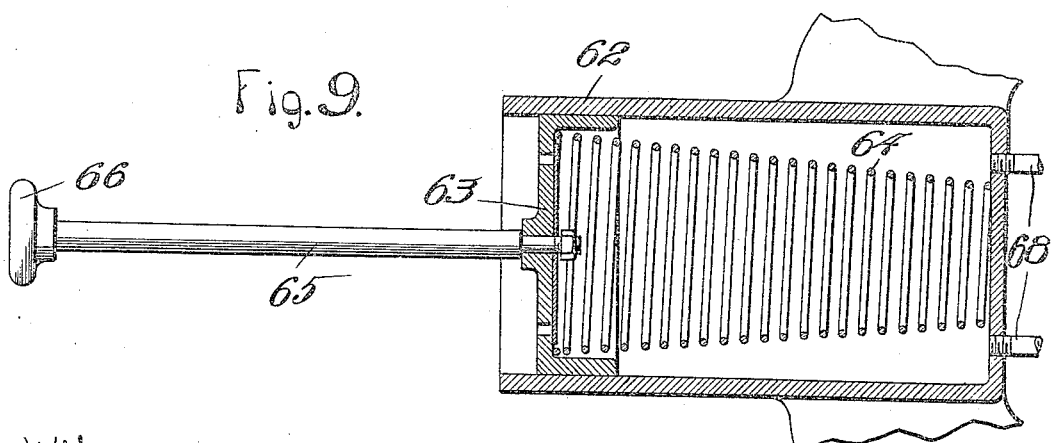

UNITED STATES PATENT OFFICE.

FRANK STREICH, OF ST. LOUIS, MISSOURI, ASSIGNOR TO AMERICAN BAKERS MACHINERY COMPANY, OF ST. LOUIS, MISSOURI, A CORPORATION OF MISSOURI.

DOUGH-MOLDING MACHINE.

957,390.  Specification of Letters Patent. Patented May 10, 1910.

Application filed June 21, 1909. Serial No. 503,409.

*To all whom it may concern:*

Be it known that I, FRANK STREICH, a citizen of the United States, residing at St. Louis, Missouri, have invented a certain new and useful Improvement in Dough-Molding Machines, of which the following is a full, clear, and exact description, such as will enable others skilled in the art to which it appertains to make and use the same, reference being had to the accompanying drawings, forming part of this specification, in which—

Figure 1 is a side elevation of a dough molding machine of my improved construction. Fig. 2 is a top plan view of the machine. Fig. 3 is a detail section taken on the line 3—3 of Fig. 1. Fig. 4 is a detail section taken on the line 4—4 of Fig. 1. Fig. 5 is a vertical section taken on the line 5—5 of Fig. 3. Fig. 6 is an enlarged detail section taken on the line 6—6 of Fig. 5. Fig. 7 is an enlarged sectional view taken on the line 7—7 of Fig. 1. Fig. 8 is a detail view, partly in section of the means for delivering and distributing the lumps of dough on the machine. Fig. 9 is a horizontal section taken through the center of an air blast cylinder utilized in connection with my improved machine.

This invention relates to new and useful improvements in machines for molding lumps of dough, and is designed as an improvement on a similar machine shown and described in an application for United States Letters Patent filed by me January 22d, 1909, Serial No. 473,768.

In machines of the character to which my invention pertains, the lumps of dough of proper weight are delivered to the machine and are automatically and gradually fed therethrough, during which time certain elements of the machine engage and knead the dough after the manner of manual manipulation, the skin on the top and sides of the lump being stretched and drawn to substantially a point at the bottom of the lump. The kneading of the lumps of dough as they pass through the machine prevents the formation of large gas bubbles in the center of the loaf, and by subjecting the lump to uniform treatment throughout, simultaneously with the skin-stretching operation, the texture of the loaf is uniform.

The essential features of my present invention reside in simple means which may be operated with little power for shifting the molding boards upon the table of the machine; means whereby the laterally moving molding boards are adjusted without changing the positions of the lower edges of said laterally moving molding boards relative to the surface of the table; to provide simple automatically operating means for distributing the lumps of dough on to the table of the machine between the movable molding boards; and to provide simple automatically operating means whereby flour is discharged by means of air blasts and on to the surface of the movable molding boards and the molding table.

Referring by numerals to the accompanying drawings, 1 designates the frame of the machine which supports a rigid molding table 2, and arranged at one end of said table is a shelf or trough 3 which receives the lumps of dough after the same pass through the machine. Fixed to the ends of the frame 1 are horizontally disposed guide tracks 4, and operating in one of said guide tracks is a roller 5 carried on the lower end of a post 6 which extends downward from one end of a vertically disposed longitudinally moving molding board 7. This molding board 7 is constructed of either wood or metal with its side faces covered with suitable fabric 8, and the lower portion of said board operates in a groove 9 formed in the top of the table 2. Fixed to the ends of the frame 1 are end castings 10, and depending from the central portions of said castings are slotted guide blocks 11, in which operate rails 12 fixed on top of the ends of the molding board 7. In this manner the molding board 7 is rigidly held against lateral play during its longitudinal movement. Fixed on a power shaft suitably journaled in the lower portion of the frame 1 is a pinion 13 which meshes with a beveled gear wheel 14 fixed on a vertically disposed shaft 15, and fixed on the upper end of said shaft 15 is a crank disk 16. Journaled on a pin or trunnion carried by this disk 16 are the inner ends of two links 17 and 18, the outer end of the link 17 being pivotally connected to the lower portion of the post 6, and the outer end of the link 18 being provided with a roller 19 which travels in the slotted guide 4 opposite the slotted guide in which the lower end of the post operates.

It will be readily understood that the mechanism just described provides simple means for moving the molding boards 7 longitudinally as the crank disk 16 rotates, and the movement of the molding board 7 will be relatively slow at the time of its reversal, for the reason that the trunnion or pin on which the link 17 is journaled passes the "line of centers" at the time the movement of the molding board 7 is reversed.

20 designates the inclined molding boards which are arranged to move laterally upon the table 2. Arranged to slide in suitable bearings fixed to the under side of the table 2 adjacent its ends are pairs of rods 21, and carried thereby are brackets 22, the upper portions of which extend inward over the table 2, as designated by 23. Fulcrumed to the under side of the table 2 between each pair of rods 21 is a short lever 24, and pivotally connected to the ends thereof are the inner ends of links 25, the outer ends of which are pivotally connected to the lower ends of the brackets 22. Links or connecting rods 26 are pivotally connected to the central portions of the links 17 and 18, and the outer ends of said links 26 are connected to the outer ends of a pair of the links 25.

The mechanism just described provides means whereby the levers 24 are oscillated in order to move the pairs of brackets 22 simultaneously to and from one another, and which movement is dependent upon the action of the links 17 and 18.

Fulcrumed to the inner ends of the portions 23 of the brackets 22 are upwardly and outwardly projecting levers 27, and pivotally connected to the upper portion of each of these levers is a pair of parallel links 28, the inner ends of which are pivotally connected to ears carried by the rear sides of the laterally moving molding boards 20. Pivotally connected to the upper one of each pair of these ears is an adjusting bat 29, the lower end of which is slotted as designated by 30, and through which slotted end passes a bolt or set screw 31, which is seated in the corresponding bracket 22.

The mechanism just described provides means for adjusting the angularity of the molding boards 20 without disturbing the relation of the lower ends of said molding boards and the surface of the table 2.

32 and 33 designate a pair of rods which extend the entire length of the machine, the ends thereof being seated in the end castings 10, and rod 32 is arranged to rock in suitable bearings formed on said end castings. Mounted on these rods 32 and 33, a short distance from the left hand one of the castings 10 is a bracket 34 provided on its upper end with a bearing 35, and journaled therein is one end of a roller 36, the opposite end being journaled in a bearing formed in the upper end of a bracket 37, which last-mentioned bracket projects from the left hand end casting 10. Passing around the roller 36 is an endless conveyer 38 which delivers the lumps of dough to the machine. The lump-distributing means is arranged beneath the roller 36 and comprises a block 39 which is loosely mounted on a short rod 40 arranged between the rods 32 and 33, the ends of which rod 40 are seated in the lower portions of the brackets 34 and 37. Fixed to the block 39 is an inverted V-shaped distributing plate 41, the lower ends of which are bent outward, as designated by 42. This distributing device being loosely mounted on the rod 40, is free to swing from one side to the other, and thus the lumps of dough delivered on to the distributing device are alternately deposited on opposite sides of the longitudinally moving molding board 7. The swinging movement of the distributing device is limited in both directions by the engagement of the block 39 against the rods 32 and 33.

43 designates a double trough which is arranged immediately to the right of the distributing device, and said trough is supported upon the rods 32 and 33. Formed in the bottom of each portion of the double trough is a longitudinally disposed slot 44, and adjustably arranged within each trough is a plate 45 provided with a longitudinally disposed row of apertures 46. The ends of these plates 45 are bent upward at the ends of the trough 43, as designated by 47, and connecting the upper ends of a pair of said upwardly bent ends is a cross piece 48, thus providing means for simultaneously shifting both the perforated plates 45. A set screw 49 passes through a slot formed in one of the upwardly bent ends 47, and is seated in the end of the trough 43, thus providing means for holding the plates 45 in their adjusted positions. Passing through the upwardly bent ends 47, and journaled in the ends of the trough 43, is a pair of rods 50, and fixed on the left hand ends of said rods are crank arms 51, the upper ends of which are united by a link 52. Fixed on the movable rod 32 at the left hand end of the trough is an arm 53, the upper end of which is slotted, as designated by 54, to receive a pin 55 carried by the end of the link 52.

56 designates wiping rods which engage the top surfaces of the plates 45, the ends of said rods being bent upward and loosely seated in suitably formed apertures in the rods 50. Located on the upturned ends of said wiping rods, beneath the rods 50, are expansive coil springs 57. Fixed on the left hand end of the rod 32 is the upper end of an arm 58, the lower end of which is slotted, as designated by 59, to receive a pin 60 seated in the left hand end of one of the molding boards 20.

The mechanism just described provides means whereby flour is continuously discharged from the troughs 43 while the machine is in operation, and which flour is distributed over the surfaces of the molding boards in order to prevent the dough from sticking thereto.

Supported on a bracket 61 carried by the left hand end casting 10 is a horizontally disposed cylinder 62, in which is arranged for operation a piston 63, and interposed between the closed inner end of said cylinder and said piston is an expansive coil spring 64. Carried by the piston 63 is a rod 65 having a knob 66 on its outer end, and adapted to engage this knob and move the piston 63 forward through the cylinder is a bracket 67 carried by the left hand end of the molding board 7. Leading from the closed end of the cylinder 62 is a pair of horizontally disposed air pipes 68, the discharge ends of which terminate immediately beneath the left hand end of the double trough 43. Thus the air discharged from the pipe 68 when the piston 62 is forced into the cylinder will blow the flour discharging from the slots 44 onto the working surfaces of the molding boards.

The operation of my improved machine is as follows: Rotary motion is imparted to the shaft 15 by means of the power shaft carrying the pinion 13, which meshes with the gear wheel 14, and as the crank disk 16 is rotated the links 17 and 18 are moved longitudinally and the molding board 7 is consequently reciprocated longitudinally upon the table 2. Simultaneously with the movement of the molding board 7 the inclined molding boards 20 are moved to and from said molding board 7 by means of the mechanism comprising the links 26, links 25 and levers 24, which links 26 are connected to the links 17 and 18. The lateral movement of the molding boards 20 is timed with relation to the longitudinal movement of the molding board 7, so that as said board 7 is moving in one direction, starting slowly at first, its speed increasing as the crank pin on the disk 16 reaches its position of greatest angularity, and then slowly decreasing until brought to a position of rest and its motion reversed. The action of the molding boards 20 corresponds to the movement of the molding board 7, that is, said boards 20 start slowly, then gradually increase in speed, then decrease in speed until brought to a position of rest, and then reversed. The molding boards 20 move toward the board 7 while the latter is moving in the opposite direction. Lumps of dough of proper weight are delivered by the carrier 38 onto the distributing plate 41, and as said lumps of dough strike said plate, the same is alternately shifted from side to side, as shown by solid and dotted lines in Fig. 8, and thus said lumps of dough are alternately delivered onto opposite sides of the molding board 7. The lumps of dough drop onto the table 2, and as the boards 20 move toward the board 7, said lumps of dough are moved toward said board 7. As said boards 20 reach their inward limit of movement, the lumps are subjected to lateral pressure and at the same time rotated between the molding boards 7 and 20 by frictional engagement with the longitudinally moving board 7. As the boards 20 occupy positions at angles relative to the board 7, the combined pressure upon and the rotary motion imparted to the lumps of dough will result in a gradual drawing of the skin downward to the bottom of each lump of dough, and this action is intermittently repeated as the lumps of dough pass through the machine due to the movement of the board 7. The lumps of dough discharge from the right hand end of the machine in to the trough or shelf 3, are removed therefrom, and are now placed in the pans or ovens.

The double trough 43 is filled with flour, and as the molding boards 20 move backward and forward, the arm 58 is correspondingly swung backward and forward, which movement rocks the rod 32, and the arm 53 carried thereby imparts movement to the crank arms 51 connected by the link 52, and thus the rods 50 are slightly rocked. The wiping rods 56 carried by the rods 50 move backward and forward over the rows of apertures 46, thus continuously feeding the flour through said apertures and through the slots 44 in the bottom of the double trough 43. As the molding board 7 moves toward the right, the bracket 67 engages the knob 66 on the outer end of the rod 65, thus moving the piston 63 through the cylinder 62 and consequently forcing air through the pipes 68, which air strikes the flour discharging from the trough 43 and blows same onto the engaging surfaces of the molding boards, thus preventing the lumps of dough from sticking thereto. The discharge of flour from the trough 43 is controlled by shifting the plates 45 in one direction or other, which movement is accomplished by manually egaging the link 48 and swinging the upturned ends 47 of the plates 45 on the rods 50. The angular positions of the molding boards 20 are adjusted by loosening the bolts or set screws 31 and raising or lowering the links 29.

A machine of my improved construction is comparatively simple, is automatic in all its operations, and very rapidly and efficiently performs the required work.

I am aware that minor changes in the construction and arrangement of the several parts of my machine may be made and substituted for those herein shown and described, without departing from the spirit of my invention.

I claim:

1. In a dough molding machine, the combination with a molding board adapted to reciprocate lengthwise, and a pair of laterally moving molding boards, of means whereby the lumps of dough delivered to the machine are alternately distributed onto opposite sides of the reciprocating molding board.

2. In a dough molding machine, a molding board adapted to reciprocate lengthwise, a pair of laterally moving molding boards, and a dough-lump distributer adapted to alternately feed the lumps of dough between the reciprocating molding board and the laterally moving molding boards.

3. In a dough molding machine, a molding board adapted to reciprocate lengthwise, a pair of laterally moving molding boards, means whereby all of said molding boards are operated, and a dough-lump distributer adapted to alternately feed the lumps of dough between the reciprocating molding board and the laterally moving molding boards.

4. In a dough molding machine, a molding board adapted to reciprocate lengthwise, a pair of laterally moving molding boards, means for conveying lumps of dough to the machine, and a dough-lump distributer adapted to receive the lumps of dough from the conveying means and alternately deliver the same between the molding boards.

5. In a dough molding machine, a reciprocating molding board, a pair of laterally moving molding boards, means whereby lumps of dough are conveyed to the machine, and means adapted to receive the lumps of dough from the feeding means and alternately deliver said lumps of dough onto opposite sides of the reciprocating molding board.

6. In a dough molding machine, a vertical molding board, molding boards having inclined faces arranged adjacent the side faces of the vertical molding board, and a dough lump distributing member pivotally mounted above the molding boards at one end of the machine whereby lumps of dough are distributed between said molding boards.

7. In a dough molding machine, a vertical molding board, a pair of inclined molding boards, means whereby the vertical molding board is reciprocated and the inclined molding boards are vibrated and means for alternately distributing lumps of dough on opposite sides of the vertical molding board.

8. In a dough molding machine, a reciprocating molding board, a pair of laterally moving molding boards arranged on opposite sides of the reciprocating molding board, and means actuated by the weight of the lumps of dough delivered to the machine whereby said lumps of dough are alternately distributed on opposite sides of the reciprocating molding board.

9. In a dough molding machine, a reciprocating molding board, a pair of laterally moving molding boards arranged on opposite sides of the reciprocating molding board, and means actuated by the weight of the lumps of dough delivered to the machine whereby said lumps of dough are alternately distributed between the reciprocating molding board and the laterally moving molding boards.

10. In a dough molding machine, the combination with a reciprocating molding board and vibrating molding boards for manipulating the dough, of means for distributing flour onto the surfaces of the molding boards, consisting of a receptacle having an outlet, a cylinder, a spring pressed piston operating therein, which piston is actuated by the dough molding machine and a jet tube leading from the cylinder to a point adjacent the outlet of the receptacle.

11. In a machine of the class described, a plurality of molding boards, a flour receptacle having an outlet, adjustable means for controlling the discharge of flour from the outlet, and an air blast means for distributing the flour discharged from the receptacle onto the surfaces of the molding boards, comprising a cylinder, a spring pressed piston operating therein and a jet pipe leading from said cylinder to a point adjacent the outlet of the flour receptacle.

12. In a dough molding machine, a reciprocating molding board, a pair of inclined molding boards arranged for lateral movement at the sides of the reciprocating molding board, means whereby the angularity of the inclined boards is adjusted, and an automatic dough-lump distributer arranged to alternately distribute the lumps of dough on opposite sides of the reciprocating molding board.

13. In a dough molding machine, a reciprocating molding board, a pair of inclined molding boards arranged for lateral movement at the sides of the reciprocating molding board, means whereby the angularity of the inclined boards is adjusted, an automatic dough-lump distributer arranged to alternately distribute the lumps of dough on opposite sides of the reciprocating molding board, and means actuated by the machine for distributing flour onto the engaging surfaces of the molding boards.

14. In a machine of the class described, means comprising a reciprocating molding board and a pair of vibrating molding boards whereby lumps of dough are subjected to rolling action and lateral pressure, and means whereby flour is delivered on to the lumps of dough and the means engaging said lumps of dough.

15. In a dough molding machine, a longitudinally reciprocating molding board adapted to impart rotary motion to the lumps of dough delivered to the machine, a pair of vibrating molding boards adapted to co-act with the first-mentioned molding board for applying pressure to the lumps of dough, and means whereby the lumps of dough are distributed between said molding boards.

16. In a dough molding machine, a longitudinally reciprocating molding board adapted to impart rotary motion to the lumps of dough delivered to the machine, a pair of vibrating molding boards adapted to co-act with the first-mentioned molding board for applying pressure to the lumps of dough, and means whereby flour is delivered onto the surfaces of the molding boards.

17. In a dough molding machine, a longitudinally reciprocating molding board adapted to impart rotary motion to the lumps of dough delivered to the machine, a pair of vibrating molding boards adapted to co-act with the first-mentioned molding board for applying pressure to the lumps of dough, means whereby the lumps of dough are distributed between said molding boards, and means whereby flour is delivered onto the surfaces of the molding boards.

18. In a machine of the class described, plural means, whereby lumps of dough are intermittently subjected to simultaneous rolling action and lateral pressure, and a pivotally mounted dough lump distributing member arranged above one end of the said plural means and actuated by the weight of the lumps of dough for alternately distributing the dough lumps between the said plural means.

19. In a machine of the class described, plural means whereby lumps of dough are intermittently subjected to simultaneous rolling action and lateral pressure, means actuated by the weight of the lumps of dough whereby said lumps of dough are distributed between said plural means, and means whereby flour is delivered onto the lumps of dough and the engaging surfaces of said plural means.

In testimony whereof I hereunto affix my signature in the presence of two witnesses, this 18th day of June, 1909.

FRANK STREICH.

Witnesses:
ALMA GEBHART,
LENORE CLARK.